(12) United States Patent
Peng et al.

(10) Patent No.: US 12,529,374 B2
(45) Date of Patent: Jan. 20, 2026

(54) DEVICE AND METHOD FOR MONITORING OIL PRESSURE AND GAS PRESSURE OF DIAPHRAGM COMPRESSOR

(71) Applicant: Xi'an Jiao Tong University, Shaanxi (CN)

(72) Inventors: Xueyuan Peng, Shaanxi (CN); Xueying Li, Shaanxi (CN); Shengdong Ren, Shaanxi (CN); Ting Wang, Shaanxi (CN); Xiaohan Jia, Shaanxi (CN)

(73) Assignee: Xi'an Jiao Tong University, Shaanxi (CN)

( * ) Notice: Subject to any disclaimer, the term of this patent is extended or adjusted under 35 U.S.C. 154(b) by 854 days.

(21) Appl. No.: 17/312,012

(22) PCT Filed: Jul. 9, 2019

(86) PCT No.: PCT/CN2019/095259
§ 371 (c)(1),
(2) Date: Jun. 9, 2021

(87) PCT Pub. No.: WO2021/003669
PCT Pub. Date: Jan. 14, 2021

(65) Prior Publication Data
US 2022/0056902 A1    Feb. 24, 2022

(51) Int. Cl.
*F04B 51/00*    (2006.01)
*F04B 45/053*    (2006.01)
*F25B 49/02*    (2006.01)

(52) U.S. Cl.
CPC .......... *F04B 51/00* (2013.01); *F04B 45/0533* (2013.01); *F25B 49/022* (2013.01);
(Continued)

(58) Field of Classification Search
CPC .. F04B 51/00; F04B 45/0533; F04B 2205/03; F04B 2205/04; F04B 45/053; F25B 49/022
See application file for complete search history.

(56) References Cited

U.S. PATENT DOCUMENTS 2,452,526 A * 10/1948 Osborne ............... F04B 43/009
                                                              417/389
4,133,100 A *  1/1979 Myhre .................. G01L 9/0055
                                                              216/2
(Continued)

FOREIGN PATENT DOCUMENTS

CN      102818663       12/2012
CN      109973534        7/2019
RU      2003132075 A *   4/2005

OTHER PUBLICATIONS

Raw Machine Translation of RU2003132075; Gubkin et al., "Pressure strain gauge"; Apr. 20, 2005.*

(Continued)

*Primary Examiner* — Charles G Freay
*Assistant Examiner* — Lilya Pekarskaya
(74) *Attorney, Agent, or Firm* — JCIP GLOBAL INC.

(57) ABSTRACT

A device and a method for monitoring oil pressure and gas pressure of a diaphragm compressor are provided. The monitoring device includes a gas cylinder and a strain gauge circuit. The gas cylinder includes a cylinder head. The strain gauge circuit includes a strain gauge component and a bridge circuit that are connected to each other, and the strain gauge component is arranged on the cylinder head.

3 Claims, 6 Drawing Sheets

(52) U.S. Cl.
CPC ......... *F04B 45/053* (2013.01); *F04B 2205/03* (2013.01); *F04B 2205/04* (2013.01)

(56) References Cited

U.S. PATENT DOCUMENTS

| | | | | |
|---|---|---|---|---|
| 4,376,929 | A | * | 3/1983 | Myhre .................... G01L 9/006 216/2 |
| 4,566,858 | A | * | 1/1986 | Akiba .................... F04B 49/06 417/45 |
| 4,820,129 | A | * | 4/1989 | Magnussen, Jr. ....... F04B 49/10 417/18 |
| 2003/0031565 | A1 | * | 2/2003 | Kleibrink ............ F04B 45/0533 417/388 |
| 2005/0025631 | A1 | * | 2/2005 | Lake ...................... F04B 51/00 417/63 |

OTHER PUBLICATIONS

"International Search Report (Form PCT/ISA/210) of PCT/CN2019/095259", mailed on Apr. 1, 2020, with English translation thereof, pp. 1-4.

Mengjie Li et al., "Simulation Study on the Relationship between Cylinder Head Stress and Cylinder Pressure," Modeling and Simulation, vol. 7, May 2018, pp. 103-112.

\* cited by examiner

DEVICE AND METHOD FOR MONITORING OIL PRESSURE AND GAS PRESSURE OF DIAPHRAGM COMPRESSOR

CROSS-REFERENCE TO RELATED APPLICATION

This application is a 371 of international application of PCT application serial no. PCT/CN2019/095259, filed on Jul. 9, 2019. The entirety of the above-mentioned patent application is hereby incorporated by reference herein and made a part of this specification.

BACKGROUND

Technical Field

The present disclosure relates to the field of compressor technologies, and more particularly, to a device and a method for monitoring oil pressure and gas pressure of a diaphragm compressor.

Description of Related Art

A diaphragm compressor is special equipment for gas compression that does not allow any leakage in a compression chamber. Because of its better sealing performance, wider pressure range, and larger compression ratio, the diaphragm compressor is widely used in the petrochemical industry and hydrogen refueling stations to compress and transport various high-purity gases, precious rare gases, toxic and harmful gases and corrosive gases. In the diaphragm compressor, a piston pushes working oil in an oil cavity of a cylinder, and then pushes a diaphragm to reciprocate in a diaphragm cavity to change a working volume of the gas cavity, and achieve a leak-free cyclical work process with the cooperation of a suction valve and a discharge valve. In a hydraulic oil circulation system of the diaphragm compressor, oil leaked from a hydraulic piston ring is compensated by a compensation loop, and the quantity of oil compensated is adjusted by mounting an oil overflow valve on an oil-side cylinder head.

Oil pressure and gas pressure variation of the diaphragm compressor is a comprehensive reflection of working performances and operating states of the compressor. Oil pressure and gas pressure variation curves in the working process of the diaphragm compressor can reflect a position of the piston, the time of a suction process, actions of opening and closing the suction valve, actions of opening and closing the discharge valve, the time of a discharge process, actions of the oil overflow valve, and an oil replenishment process. Therefore, the oil pressure and gas pressure variation curves are the most effective tools for diagnosing a fault of the diaphragm compressor. It is an effective method for improving equipment operation reliability and safety by dynamically monitoring the oil pressure of the diaphragm compressor, and it is a strong demand of diaphragm compressor designers and users to ensure the monitoring of equipment operation states.

The diaphragm compressor has a high operational pressure ratio and a wide operational pressure range, and its discharge pressure can reach up to 300 MPa. However, if a pressure tap is machined on a cylinder body of the diaphragm compressor to monitor hydraulic pressure in an oil-side cylinder head and a gas pressure in a gas-side cylinder head of the diaphragm compressor, strength of the cylinder may be impacted, and leakage may be caused, and thus potential safety hazard may be brought about.

SUMMARY

1. Technical Problem to be Solved

A diaphragm compressor has a high operational pressure ratio and a wide operational pressure range, and its discharge pressure can reach up to 300 MPa. However, if a pressure tap is machined on a cylinder body of the diaphragm compressor to monitor hydraulic pressure in an oil-side cylinder head and a gas pressure in a gas-side cylinder head of the diaphragm compressor, strength of the cylinder may be impacted, and leakage may be caused, and thus potential safety hazard may be brought about. The present disclosure provides a device and a method for monitoring oil pressure and gas pressure of a diaphragm compressor.

2. Technical Solutions

To achieve the above-mentioned objective, the present disclosure provides a device for monitoring oil pressure and gas pressure of a diaphragm compressor, and the device includes a gas cylinder and a strain gauge circuit.

The gas cylinder includes a cylinder head and a discharge valve hole, wherein the discharge valve hole is arranged on the cylinder head.

The strain gauge circuit includes a strain gauge component and a bridge circuit connected to each other. The strain gauge component includes a first strain gauge set and a second strain gauge set, wherein the first strain gauge set is arranged on an outer surface of the cylinder head, the second strain gauge set is arranged on a bottom plane of the discharge valve hole, and both the first strain gauge set and the second strain gauge set are connected to the bridge circuit.

Alternatively, the first strain gauge set includes a first strain gauge and a second strain gauge, and the first strain gauge and the second strain gauge are vertical to each other.

The second strain gauge set includes a third strain gauge and a fourth strain gauge, and the third strain gauge and the fourth strain gauge are vertical to each other.

Alternatively, the strain gauge component further includes a third strain gauge set and a fourth strain gauge set.

The third strain gauge set is arranged on a flange, the flange is arranged on a gas discharge pipeline, and the fourth strain gauge set is arranged on the flange.

Alternatively, the strain gauge component is connected to a half-bridge circuit.

Alternatively, the strain gauge component is connected to a full-bridge circuit.

Alternatively, the device further includes a photoelectric sensor unit and a data collection unit, wherein the photoelectric sensor unit includes a flywheel, and the flywheel and a photoelectric sensor are arranged correspondingly. The data collection unit is connected to the strain gauge component, and the data collection unit is connected to the photoelectric sensor, and also the data collection unit is connected to a data processing unit.

The present disclosure also provides a method for monitoring the oil pressure and gas pressure of a diaphragm compressor, and the method includes following steps.

In step 1, a strain measurement system is constructed, a strain gauge is selected according to the size of a cylinder cap, the selected strain gauge is pasted and then is connected to an electric bridge, and then a data collection unit is configured after a photoelectric sensor is installed on a flywheel.

In step 2 for collecting signals, the signal collection unit synchronously collects a first voltage signal and a second voltage signal outputted by a strain gauge circuit, converts the collected first voltage signal into a first digital signal for storage, and converts the collected second voltage signal into a second digital signal for storage.

In step 3, starting and ending time of one complete cycle is determined according to the first digital signal.

In step 4, the second digital signal is processed according to the starting and ending time of the complete cycle to obtain an oil pressure value and a gas pressure value.

Alternatively, the processing the second digital signal in the step 4 includes following steps.

(1) Calculating a Strain of a Working Strain Gauge According to a Measured Voltage Data $$\varepsilon(\theta) = \frac{4e(\theta)}{(1+\mu)EK_s}$$

wherein $\theta$ represents a crank angle, $\varepsilon(\theta)$ represents the strain, $e(\theta)$ represents the collected voltage signal, $\mu$ represents a Poisson's ratio, E represents an elastic modulus, and $K_s$ represents a sensitivity coefficient of a strain gauge.

(2) Calculating an Oil Pressure.

The cylinder head is simplified to a circular flat plate model, a radial stress and a circumferential stress of the strain gauge on an outer surface of the cylinder head are calculated based on the measured strain, and then a boundary condition of a peripheral fixed plate of a uniformly distributed load is substituted according to the structure of the diaphragm compressor to calculate the oil pressure value.

(3) Calculating a Gas Pressure.

A radial stress and a circumferential stress of a bottom plane of a discharge valve hole are calculated according to the measured strain, and then the gas pressure value is calculated.

Alternatively, in the step 2, the first voltage signal is subjected to filtering, amplification, conditioning and A/D conversion, then is converted into a first digital signal, and the first digital signal is transmitted to an intelligent terminal for processing. The second voltage signal is subjected to filtering, amplification, conditioning and A/D conversion, then is converted into a second digital signal, and the second digital signal is transmitted to the intelligent terminal for processing.

3. Beneficial Effects

Compared with the existing technologies, the device and the method for monitoring oil pressure and gas pressure of a diaphragm compressor provided by the present disclosure have following beneficial effects.

In the device for monitoring oil pressure and gas pressure of a diaphragm compressor provided by the present disclosure, the strain gauge component is arranged on a gas-side cylinder head, and the strain gauge component is connected to a bridge circuit. In this way, sensibility of the strain gauge component is improved, and input and output keep a linear relation. A strain gauge is noninvasively pasted on the gas-side cylinder head of the diaphragm compressor, and a strain gauge component is arranged to measure strain of the gas-side cylinder head, such that both oil pressure and gas pressure can be measured indirectly, and thus the oil pressure of the diaphragm compressor can be measured nondestructively. This method provided by the present disclosure is safe and reliable, and is nondestructive to the diaphragm compressor, and can achieve accurate monitoring of the oil pressure and the gas pressure especially in high-pressure working conditions.

DESCRIPTION OF THE EMBODIMENTS

Figure 1:
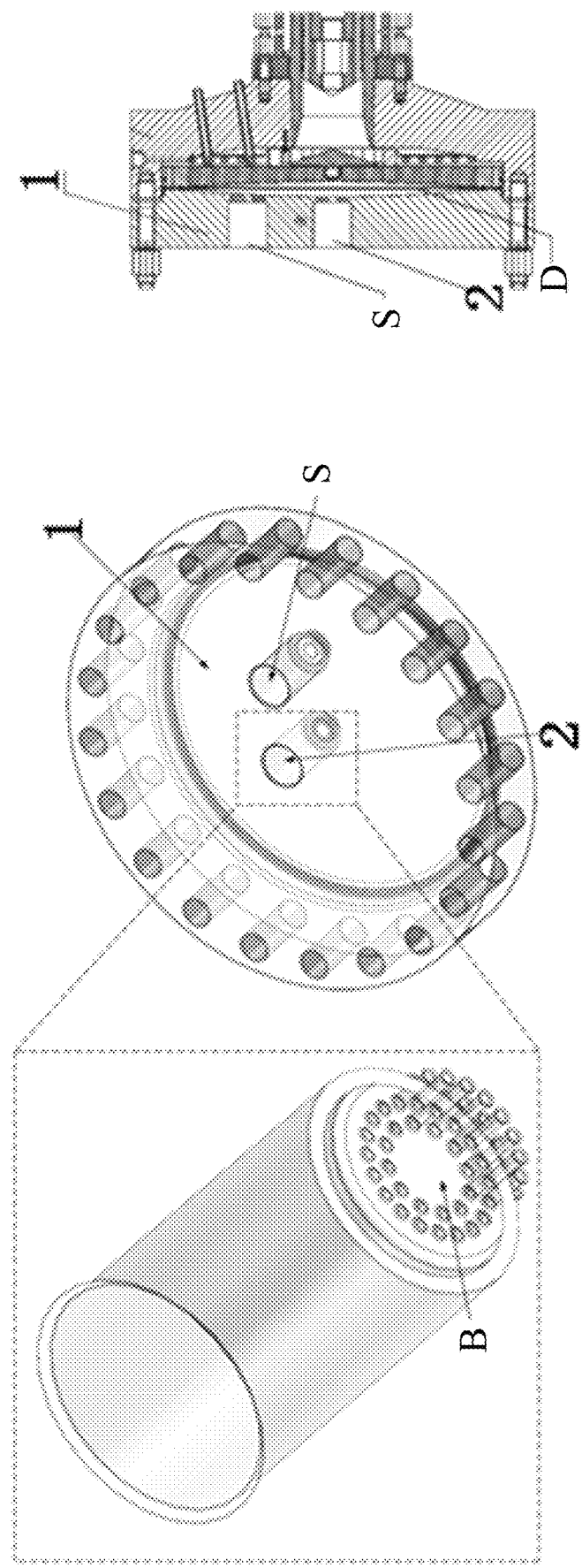
FIG. 1 is a first schematic structural diagram of a device for monitoring oil pressure and gas pressure of a diaphragm compressor according to the present disclosure.
Figure 2:
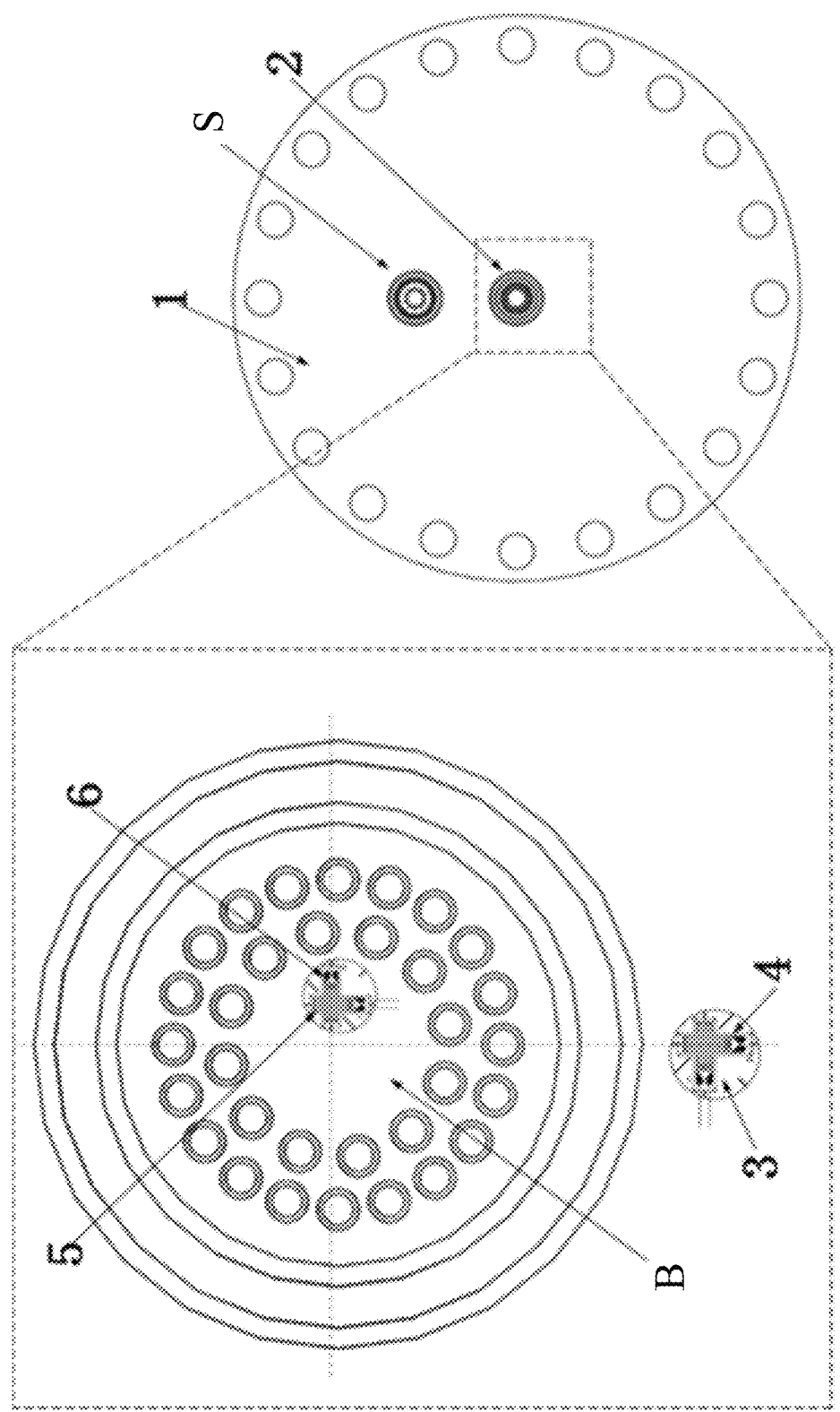
FIG. 2 is a schematic diagram showing arrangement of strain gauges according to the present disclosure.

Specific embodiments of the present disclosure will be described below in detail with reference to the accompanying drawings. According to these detailed descriptions, those skilled in the art can clearly understand the present disclosure and can implement the present disclosure. Without departing from the principle of the present disclosure, features in different embodiments may be combined to obtain new implementations, or some features in some embodiments may be replaced to obtain other preferred implementations.

A strain gauge is a component for strain measurement, which is composed of a sensitive grid or the like. The working principle of a resistance strain gauge is based on a strain effect. That is, when mechanical deformation occurs on a conductor or semiconductor material under the action of external forces, a resistance value thereof changes accordingly. This phenomenon is referred to as the "strain effect".

A quadrilateral measurement bridge circuit composed of a resistor, a capacitor, an inductor and so on is referred to as an electric bridge, wherein four sides of the electric bridge are bridge arms. As a measurement circuit, a DC power supply is connected to two ends of a diagonal of the quadrilateral to extract voltage across the other diagonal. Based on a bridge balance equation, parameters (such as resistance, resistance, capacitance, and inductance) of a component to be measured can be obtained according to values of known components in the bridge arms.

With reference to FIG. 1 to FIG. 6, the present disclosure provides a device for monitoring oil pressure and gas pressure of a diaphragm compressor, wherein the device includes a gas cylinder and a strain gauge circuit.

The gas cylinder includes a cylinder head 1 and a discharge valve hole 2, wherein the discharge valve hole 2 is arranged on the cylinder head 1.

The strain gauge circuit includes a strain gauge component and a bridge circuit connected to each other. The strain gauge component includes a first strain gauge set and a second strain gauge set. The first strain gauge set is arranged on an outer surface of the cylinder head 1, and the second strain gauge set is arranged on a bottom plane B of the discharge valve hole 2. Both the first strain gauge set and the second strain gauge set are connected to the bridge circuit.

The cylinder head 1 here is a gas-side cylinder head or an oil-side cylinder head, and the strain gauge component is pasted onto the gas-side cylinder head or the oil-side cylinder head by means of an adhesion agent. An element attached with the strain gauge component is always in a certain temperature field. If a linear expansion coefficient of the sensitive grid of the strain gauge is not equal to that of a construction material, the resistance of the sensitive grid may change when the temperature changes because extensions (or compressions) of the sensitive grid and the element are not equal and thus additional tension (or compression) is exerted on the sensitive grid, which leads to inaccurate measurement. This phenomenon is referred to as a temperature effect.

The strain gauge component is a sensor whose resistance changes with stress. Almost all the strain gauge components 2 have lower sensitivity. By using a bridge circuit, the sensitivity of the strain gauge component 2 can be increased manyfold, and input and output keep a linear relation. The detection of the change of the strain gauge component using the bridge circuit also has the advantages of lower passing electric current and lower self-heating of the strain gauge. Therefore, the bridge circuit is frequently used in the application of the strain gauge sensor. The bridge circuit includes a one-quarter bridge connection mode, a half bridge connection mode, and a full bridge connection mode. A lead of the strain gauge is a 25 mm silver-coated copper wire (0.12 mm to 0.16 mm in diameter). The piston rods of different compressors have different diameters, and thus different models of strain gauges may be selected. That is, the strain gauges may be selected according to actual needs.

The first strain gauge set is arranged on the outer surface of the cylinder head 1. That is, a working strain gauge set is pasted onto the outer surface of the gas-side cylinder head. When a diaphragm D is not in contact with the gas-side cylinder head, there is a concomitant relationship between the oil pressure and the gas pressure, which are almost concurrent. Therefore, the strain of cylinder head 1 caused by the gas pressure is concurrent with the strain of cylinder head 1 caused by the oil pressure. When the diaphragm D contacts the gas-side cylinder head, the oil-side pressure may be directly applied to the gas-side cylinder head through the diaphragm D, so the oil pressure in the cylinder may be monitored by means of the first strain gauge set pasted on the gas-side cylinder head 1.

The gas pressure in the cylinder is monitored by means of the second strain gauge set (i.e., the working strain gauge set) pasted on the bottom plane B of the discharge valve hole 2.

A position of the gas-side cylinder head where the strain gauge is pasted includes a front side of the gas-side cylinder head. The strain gauge is pasted within a semi-plane area where there is no suction valve hole S along an extension line of a connecting line between the suction valve hole S and a center of the discharge valve hole.

The strain gage on the gas-side cylinder head or the oil-side cylinder head measures the oil pressure, and the strain gage on the discharge valve hole measures the gas pressure.

Further, the first strain gauge set includes a first strain gauge 3 and a second strain gauge 4, wherein the first strain gauge 3 and the second strain gauge 4 are vertical to each other.

The second strain gauge set includes a third strain gauge 5 and a fourth strain gauge 6, wherein the third strain gauge 5 and the fourth strain gauge 6 are vertical to each other.

Two mutually perpendicular working strain gauges W are employed, and these working strain gauges W are connected to a half-bridge circuit, and these working strain gauges W are all connected to one bridge arm of the half-bridge circuit.

Further, the strain gauge component also includes a third strain gauge set and a fourth strain gauge set.

The third strain gauge set is arranged on a flange, the flange is arranged on a gas discharge pipeline, and the fourth strain gauge set is arranged on the flange.

The first strain gauge is pasted along a radial direction on the outer surface of the gas-side cylinder head, and the second strain gauge is pasted along a circumferential direction on the outer surface of the gas-side cylinder head. The third strain gauge is pasted along the radial direction on the bottom plane B of the discharge valve hole 2, and the fourth strain gauge is pasted along the circumferential direction on the bottom plane B of the discharge valve hole 2.

In this solution, two working strain gauges W are arranged vertically on the outer surface of the gas-side cylinder head 1, two working strain gauges W are arranged vertically on the bottom plane B of the discharge valve hole 2, and four compensation strain gauges C (i.e., the fifth strain gauge set and the sixth strain gauge set) are arranged on the flange of the gas discharge pipeline. Adverse effects of temperature on measurement results may be eliminated by pasting these compensation strain gauges C. Of course, these compensation strain gauges C may also be arranged in other positions where it is ensured that these compensation strain gauges C are approximate to the cylinder cap in temperature and these compensation strain gauges C are not stressed.

Two strain gauges are respectively pasted on two positions (i.e., the outer surface of the cylinder head 1 and the bottom plane B of the discharge valve hole 2). All the four strain gauges are working strain gauges W, which are configured to measure circumferential and radial strains of the paste positions (because the cylinder head 1 is shaped like a circular flat plate, there exist strains along the circumferential direction and the radial direction). The oil pressure and the gas pressure can be calculated according to the radial and circumferential strains. The working strain gauges W are pasted on the cylinder. When the cylinder head 1 and the bottom plane B of the discharge valve hole 2 are deformed, the strain gauges pasted here may be stretched accordingly. Therefore, resistances of the working strain gauges W may be changed, and the resistance change may vary an output voltage of the bridge circuit.

Figure 3:
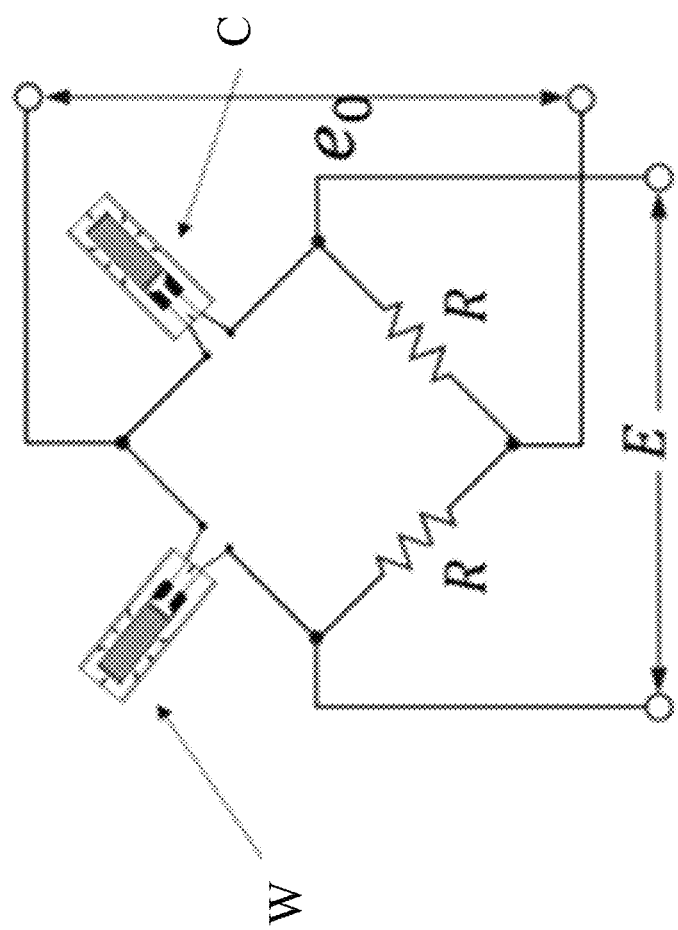
FIG. 3 is a schematic diagram showing a mode of connection between a strain gauge and a half bridge according to the present disclosure.
Figure 4:
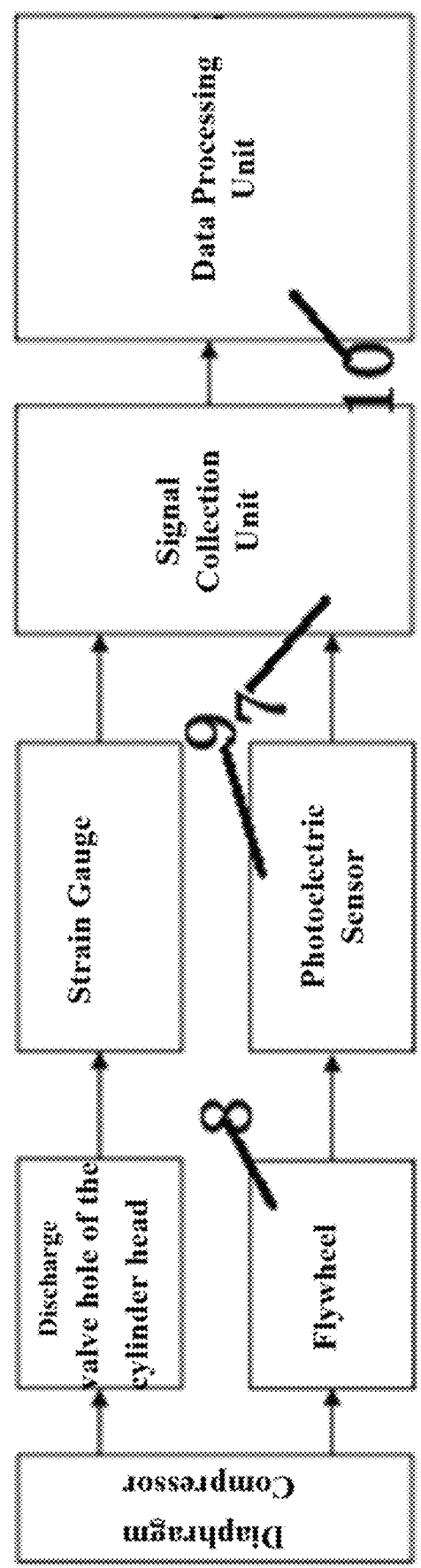
FIG. 4 is a schematic diagram of the device for monitoring oil pressure and gas pressure of a diaphragm compressor according to the present disclosure.
Figure 5:
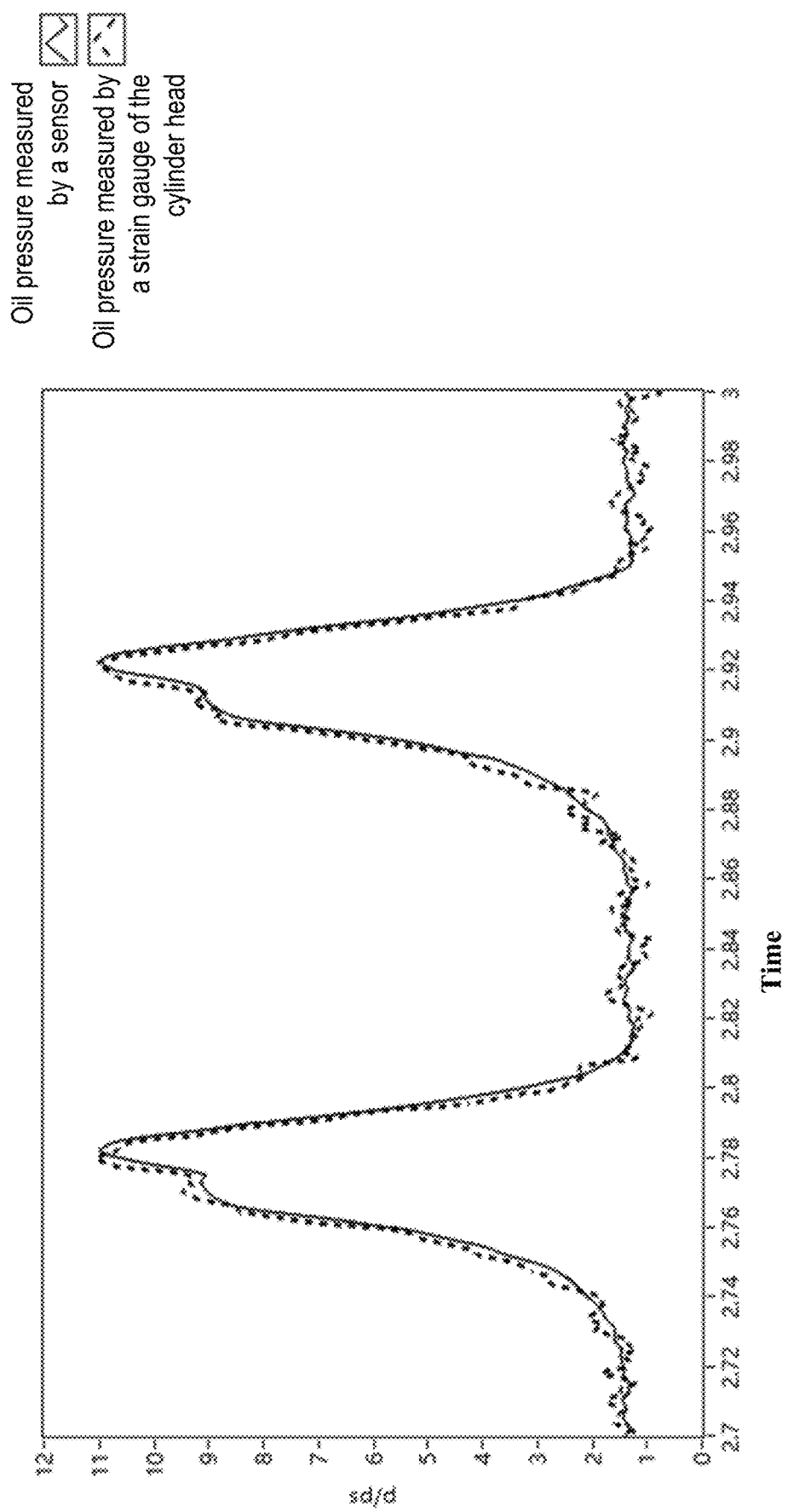
FIG. 5 is a schematic diagram showing comparison between oil pressure data measured by a sensor and oil pressure data measured by a strain gauge on a gas-side cylinder head.
Figure 6:
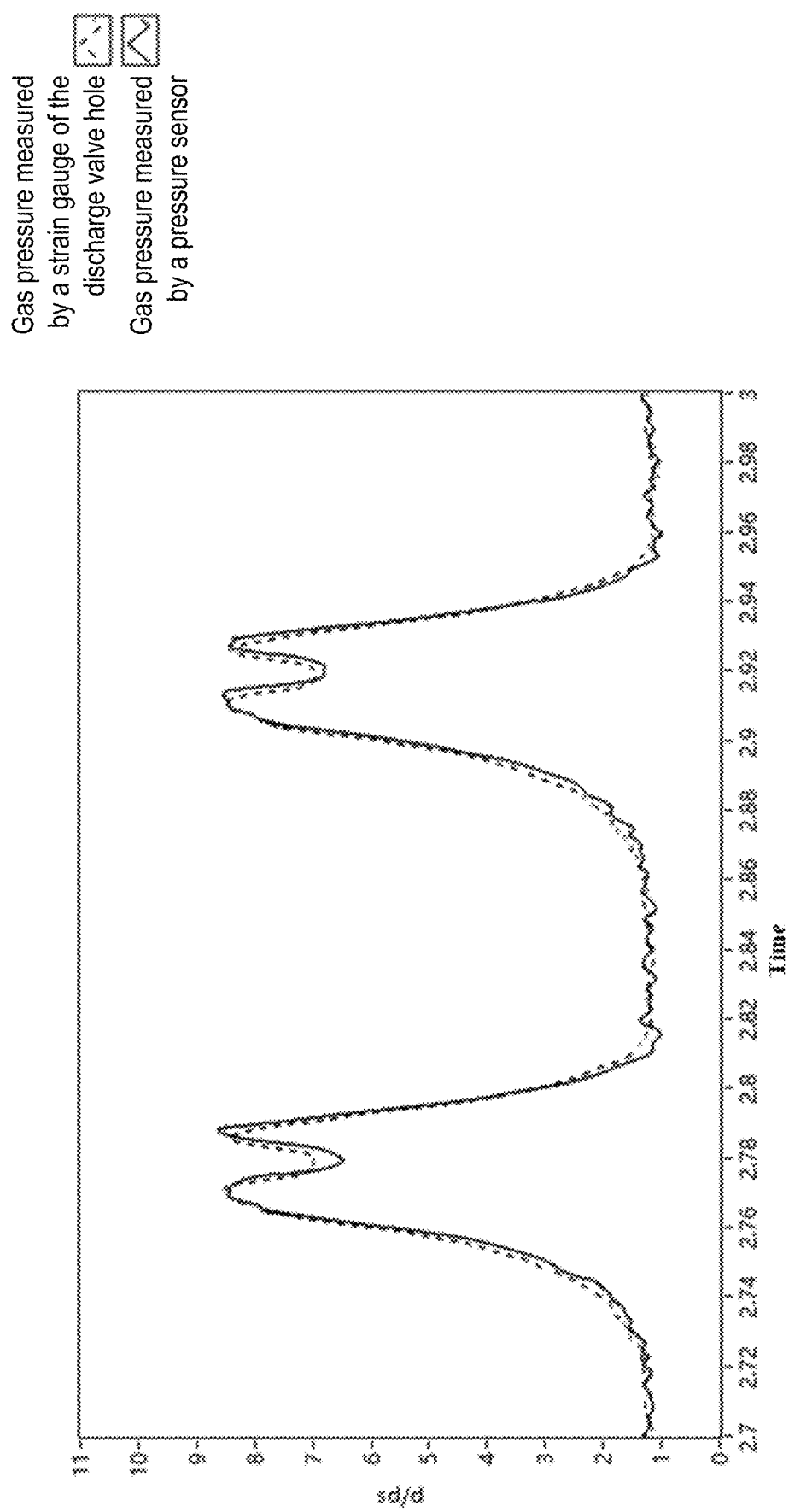
FIG. 6 is a schematic diagram showing comparison between gas pressure data measured by the sensor and gas pressure data measured by the strain gauge on the gas-side cylinder head.

Further, the strain gauge component is connected to a half-bridge circuit. The bridge circuit is constructed by using the half bridge connection mode, such that the output of the strain gauge is increased and the temperature effect on the lead is eliminated. In the half bridge connection mode, as shown in FIG. 3, one working strain gauge W and one temperature compensation strain gauge C are respectively connected to two adjacent bridge arms, and the other two bridge arms are connected to a fixed resistor.

Further, the strain gauge component is connected to a full-bridge circuit.

There are three modes for pasting the strain gauge: one-quarter bridge connection mode, a half bridge connection mode, and a full bridge connection mode, all of which are reasonable. In both the one-quarter bridge connection mode and the half bridge connection mode, only two strain gauges are connected; and in the full bridge connection mode, four strain gauges are connected.

Further, the device for monitoring oil pressure and gas pressure of a diaphragm compressor also includes a photoelectric sensor unit and a data collection unit 7. The photoelectric sensor unit includes a flywheel 8, wherein the flywheel 8 and a photoelectric sensor 9 are arranged correspondingly. The data collection unit 7 is connected to the strain gauge component, the data collection unit 7 is connected to the photoelectric sensor 9, and the data collection unit 7 is also connected to a data processing unit 10.

There are many methods for detecting piston dead center signals. Hall type sensors and photoelectric sensors are commonly used in compressor technologies. A transmitting end of a sensor is generally arranged on the flywheel 8, and the photoelectric sensor 9 generally is a reflective photoelectric sensor. An installation location of a probe of the photoelectric sensor 9 needs to be accurately positioned. That is, the flywheel 8 is rotated such that the piston is located at an inner dead center and an outer dead center respectively, and then the probe is aligned with a transmitting point (magnetic steel, iron block or reflective stripe).

The flywheel 8 rotates around an axial vertical axis until a barring gear reaches the position of a top dead center of the piston, which is used as a benchmark of phase reference. At this moment, a marker is made at any location of the flywheel 8, and a light spot sensor is mounted on a chassis, making sure that the light spot sensor is aligned with the marker. Under normal circumstances, after the photoelectric sensor 9 collects a stable signal, and when the marker shifts to the photoelectric sensor 9, an impact signal appears and serves as a cycle start location. There is one cycle between every two continuous impact signals.

The photoelectric sensor unit obtains a periodic signal to determine a complete cycle. The photoelectric sensor 9 is mounted at the flywheel 8, and an initial value of a crank angle θ of the compressor is determined as 0 by an outer dead center signal obtained. An analog signal outputted by the photoelectric sensor 9 is converted by the data collection unit 7 into a finally required digital signal, which is stored for subsequent analysis and processing.

Strain collection cards NI9237 and NI9205 and a collection suitcase cDAQ-9185 from National Instruments (NI) Corporation are used here for data collection, and the data collection is performed by writing a LabVIEW program.

The data processing unit is an intelligent terminal. The intelligent terminal here refers to equipment that can perform calculation and analysis on data, such as computers. In addition to storing data, the computers also run data collection programs to control sampling and display of signals, for example, setting parameters such as sampling frequency and sample storage length. The data collection system implements a series of functions such as signal filtering, amplification, conditioning and A/D conversion. The computers display the collected dead center signals of the photoelectric sensor 9 and the voltage signals outputted by the strain gauge circuit. The display may be monitored in real time.

The data collection unit 7 includes a collection card and a signal conditioning module. A data sampling frequency and a corresponding collection channel are set.

The data collection unit 7 implements a series of functions such as signal filtering, amplification, conditioning and A/D conversion.

The present disclosure also provides a method for monitoring oil pressure and gas pressure of a diaphragm compressor, and the method includes following steps.

In step 1, a strain measurement system is constructed, a strain gauge is selected according to the size of a cylinder cap, the selected strain gauge is pasted and then is connected to an electric bridge, and then a data collection unit is configured after a photoelectric sensor is installed on a flywheel.

In step 2 for collecting signals, the signal collection unit synchronously collects a first voltage signal and a second voltage signal outputted by a strain gauge circuit, converts the collected first voltage signal into a first digital signal for storage, and converts the collected second voltage signal into a second digital signal for storage.

In step 3, starting and ending time of one complete cycle is determined according to the first digital signal.

In step 4, the second digital signal is processed according to the starting and ending time of the complete cycle to obtain an oil pressure value and a gas pressure value.

Further, the processing the second digital signal in the step 4 includes following steps.

(1) A Strain of a Working Strain Gauge is Calculated According to the Measured Voltage Data:

$$\varepsilon(\theta) = \frac{4e(\theta)}{(1+\mu)EK_s}$$

Wherein, θ represents a crank angle (0~360°), ε(θ) represents the strain, e(θ) represents the collected voltage signal, μ represents a Poisson's ratio, E represents an elastic modulus, and $K_s$ represents a sensitivity coefficient of a strain gauge. Here strains of four working strain gauges are first calculated.

(2) Calculating an Oil Pressure

The cylinder head is simplified to a circular flat plate model, a radial stress and a circumferential stress of the strain gauge on an outer surface of the cylinder head are calculated based on the measured strain, and then a boundary condition of a peripheral fixed plate of a uniformly distributed load is substituted according to a structure of the diaphragm compressor to calculate the oil pressure value.

(3) Calculating a Gas Pressure

A radial stress and a circumferential stress of a bottom plane of a discharge valve hole are calculated according to the measured strain, and then the gas pressure value is calculated.

Further, in the step 1, the first voltage signal is subjected to filtering, amplification, conditioning and A/D conversion, then is converted into a first digital signal, and the first digital signal is transmitted to an intelligent terminal for processing. The second voltage signal is subjected to filtering, amplification, conditioning and A/D conversion, then is converted into a second digital signal, and the second digital signal is transmitted to the intelligent terminal for processing.

In a specific process of data collection, the analog signals outputted by the strain gauge and the photoelectric sensor are converted by the data collection system into finally required digital signals, which are stored in a computer hard disk for subsequent analysis and processing.

During calculation, the computers may be used to calculate according to the above formulas, and an implementation mode may be software programming or maybe Excel.

The calculation is carried out using the formulas based on the collected data. The computers are used here, and the LabVIEW program is written to carry out the calculation.

In the present disclosure, strain gauges are employed to monitor the strain on the surface of the gas-side cylinder head 1 and the strain on the bottom plane B of the discharge valve hole 2 of the diaphragm compressor. Eight strain gauges are included, namely, four working strain gauges W, and four compensation strain gauges C. The first and second ones of the working strain gauges W are pasted on the outer surface of the gas-side cylinder head 1, wherein the first one of the working strain gauges W is pasted along the radial direction, and the second one of the working strain gauges W is pasted along the circumferential direction. The third and fourth ones of the working strain gauges W are pasted on a bottom end platform of the discharge valve hole 2 of the gas-side cylinder head, wherein the third one of the working strain gauges W is pasted along the radial direction, and the fourth one of the working strain gauges W is pasted along the circumferential direction. For the compensation strain gauges C: adverse effects of the temperature on the measurement results may be eliminated by pasting the compensation strain gauges C. The compensation strain gauges C are arranged on the flange of the gas discharge pipeline (or these compensation strain gauges C may also be arranged in other positions where it is ensured that these compensation strain gauges C are approximate to the cylinder cap in temperature and these compensation strain gauges C are not stressed). The bridge circuit is constructed by using the half bridge connection mode, such that the output of the strain gauge is increased and the temperature effect on the lead is eliminated.

In the device for monitoring oil pressure and gas pressure of a diaphragm compressor provided by the present disclosure, the strain gauge component is arranged on the gas-side cylinder head, and the strain gauge component is connected to a bridge circuit. In this way, sensibility of the strain gauge component is improved, and input and output keep a linear relation. A strain gauge is noninvasively pasted on the gas-side cylinder head of the diaphragm compressor, and a strain gauge component is arranged to measure strain of the gas-side cylinder head, such that both oil pressure and gas pressure can be measured indirectly, and thus the oil pressure and the gas pressure of the diaphragm compressor can be measured nondestructively. This method provided by the present disclosure is safe and reliable, and is nondestructive to the diaphragm compressor, and can achieve accurate monitoring of the oil pressure and the gas pressure especially in high-pressure working conditions.

"First and second . . . " in the present disclosure are merely for the purpose of distinguishing the corresponding strain gauges, which have the same structures.

Although the present disclosure is described above with reference to specific embodiments, those skilled in the art should understand that within the principle and scope disclosed in the present disclosure, numerous modifications may be made to the configuration and details disclosed in the present disclosure. The protection scope of the present disclosure is determined by the appended claims, and the claims are intended to cover all modifications included in the literal meaning or scope of equivalent technical features in the claims.

What is claimed is:

1. A device for monitoring oil pressure and gas pressure of a diaphragm compressor, the device comprising:
   a strain gauge circuit;
   a cylinder head, a suction valve hole and a discharge valve hole, wherein the discharge valve hole and the suction valve hole are arranged on the cylinder head; and
   the strain gauge circuit comprises a strain gauge component and a bridge circuit connected to each other, the strain gauge component comprises a first strain gauge set and a second strain gauge set, the first strain gauge set directly contacts an outer surface of the cylinder head, wherein the first strain gauge set is located at an area along an extension line of a connecting line between a center of the suction valve hole and a center of the discharge valve hole of the cylinder head, the second strain gauge set is located within the discharge valve hole of the cylinder head, the first strain gauge set is connected to the bridge circuit, and the second strain gauge set is connected to the bridge circuit,
   wherein the strain gauge component further comprises a third strain gauge set and a fourth strain gauge set, the third strain gauge set is arranged on a flange, the flange is arranged on a gas discharge pipeline, and the fourth strain gauge set is arranged on the flange.

2. The device for monitoring oil pressure and gas pressure of the diaphragm compressor according to claim 1, wherein the first strain gauge set comprises a first strain gauge and a second strain gauge, and the first strain gauge and the second strain gauge are vertical to each other; and
   the second strain gauge set comprises a third strain gauge and a fourth strain gauge, and the third strain gauge and the fourth strain gauge are vertical to each other.

3. The device for monitoring oil pressure and gas pressure of the diaphragm compressor according to claim 1, wherein the strain gauge component is connected to a half-bridge circuit.

* * * * *